(12) United States Patent  
Millan

(10) Patent No.: US 9,277,844 B1
(45) Date of Patent: Mar. 8, 2016

(54) APPARATUS FOR VACUUM AND SWEEPING

(75) Inventor: Luis A. Millan, Tucson, AZ (US)

(73) Assignee: Luis A. Millan, Tucson, AZ (US)

( * ) Notice: Subject to any disclaimer, the term of this patent is extended or adjusted under 35 U.S.C. 154(b) by 339 days.

(21) Appl. No.: 13/317,659

(22) Filed: Oct. 25, 2011

Related U.S. Application Data

(60) Provisional application No. 61/455,668, filed on Oct. 25, 2010.

(51) Int. Cl.
 *A47L 5/36* (2006.01)
 *A47L 5/14* (2006.01)
 *A01G 1/12* (2006.01)

(52) U.S. Cl.
 CPC ... *A47L 5/36* (2013.01); *A47L 5/14* (2013.01); *A01G 1/125* (2013.01)

(58) Field of Classification Search
 CPC .............. A47L 5/14; A47L 5/36; A47L 5/24; A47L 5/225; A01G 1/125; E01H 1/0809; E01H 1/0863
 USPC .................................. 15/327.5, 339, 352, 409
 See application file for complete search history.

(56) References Cited

U.S. PATENT DOCUMENTS

| | | | | |
|---|---|---|---|---|
| 5,588,177 A | * | 12/1996 | Eriksen | 15/327.5 |
| 6,049,941 A | * | 4/2000 | Vollenweider, II | 15/327.5 |
| 6,053,382 A | * | 4/2000 | Wyant | 224/153 |
| 6,151,749 A | * | 11/2000 | Berfield | 15/327.5 |
| 6,928,693 B1 | * | 8/2005 | Ericson | 15/405 |
| 2002/0104184 A1 | * | 8/2002 | Rogers et al. | 15/327.5 |
| 2006/0005346 A1 | * | 1/2006 | Rupp et al. | 15/327.5 |
| 2008/0149676 A1 | * | 6/2008 | Bartel | 224/628 |

* cited by examiner

*Primary Examiner* — Robert Scruggs

(57) ABSTRACT

A new and useful vacuum apparatus is provided, for sweeping and cleaning a residential and commercial spaces, in a manner that is efficient and effective and a manner that minimize effort and time. The apparatus includes a flexible container that encloses some of the vacuum, sweeping and cleaning components that are part of a vacuum system, the flexible container configured to be worn by a person operating the apparatus, and having a flexibility that enables it to conform to the contour of the back of a person wearing the flexible container, and the flexible container is also configured to enable certain components of the vacuum system to be located outside of the container when the container is being worn by a person operating the vacuum system.

7 Claims, 3 Drawing Sheets

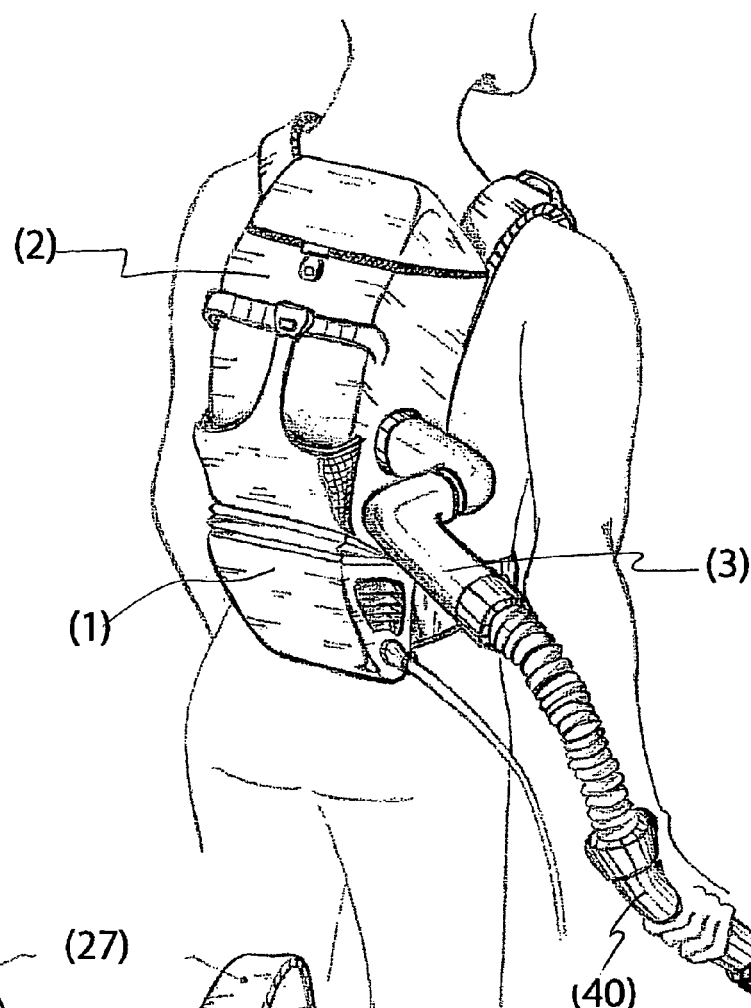
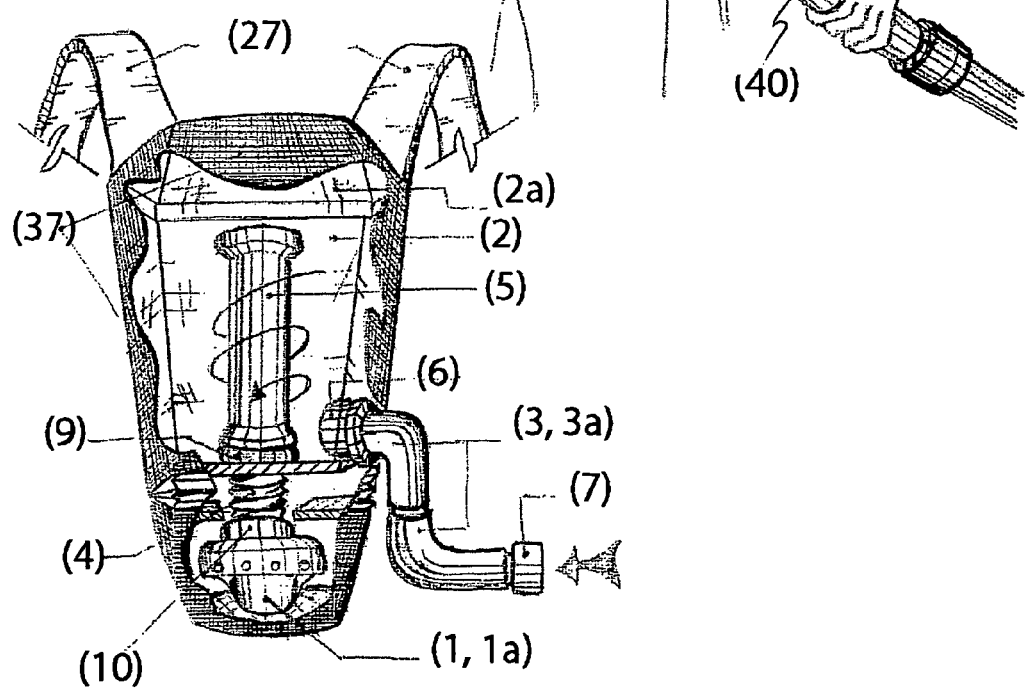
Fig. 1
Fig. 2

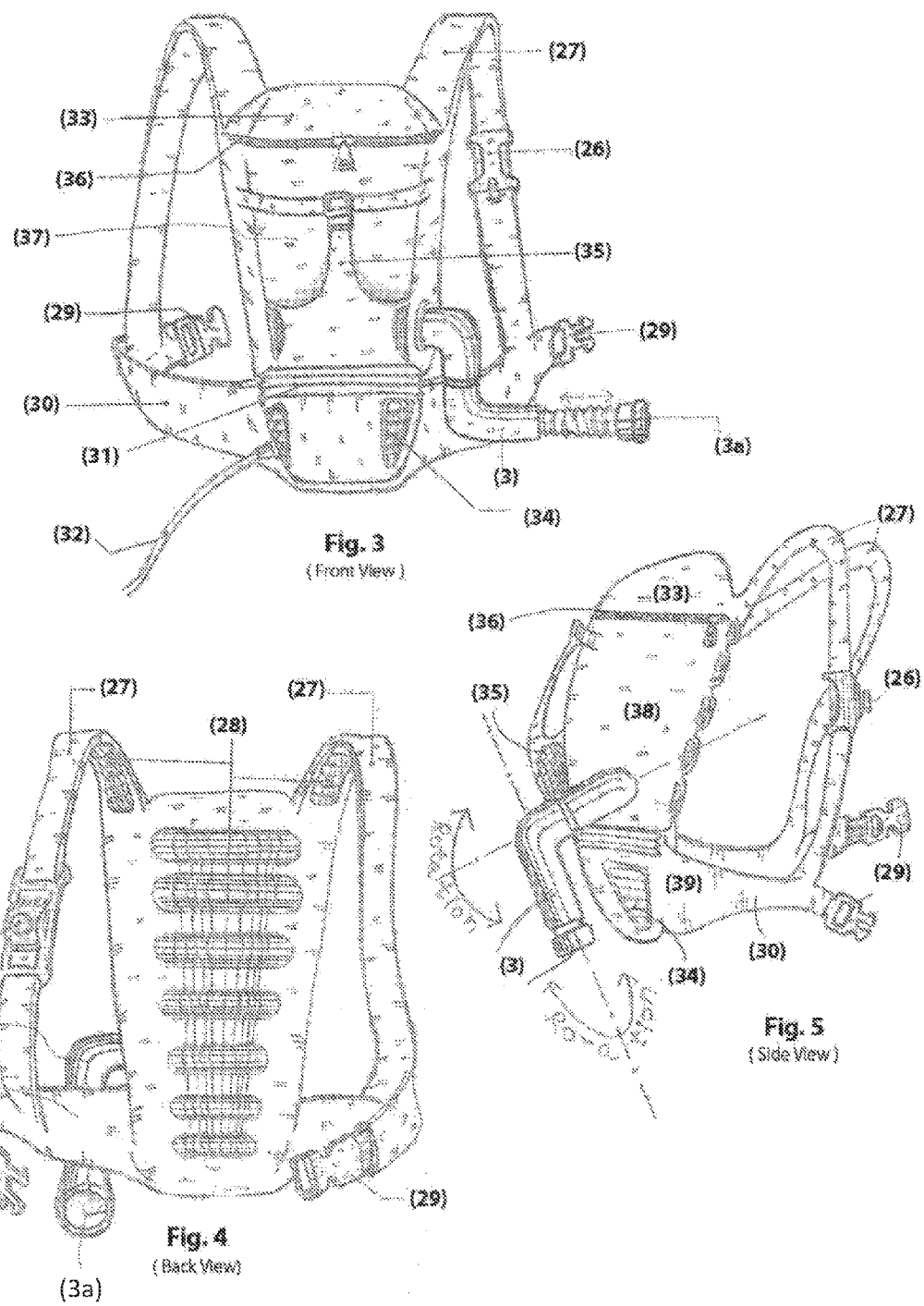

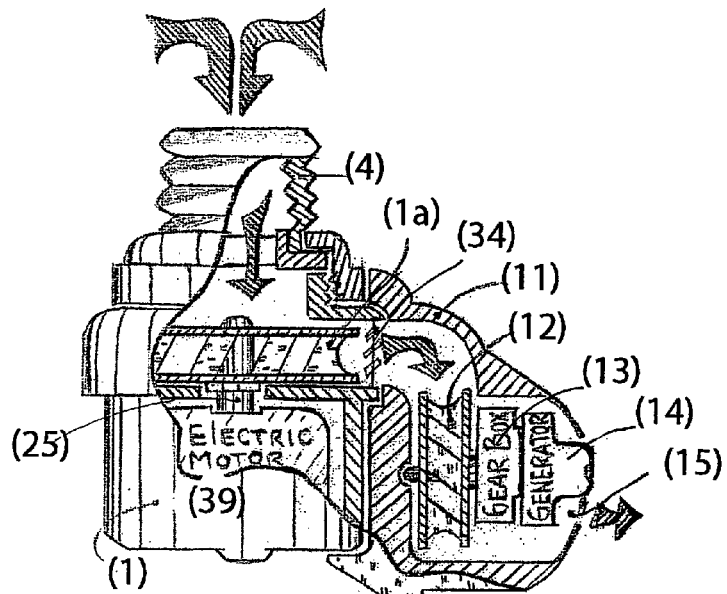
Fig. 6
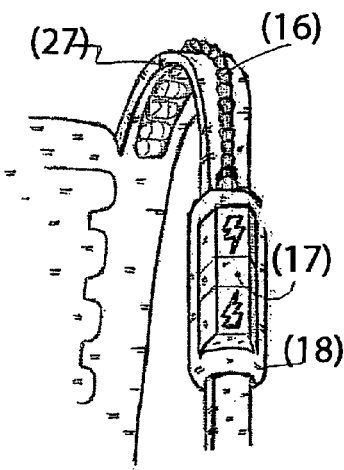
Fig. 7
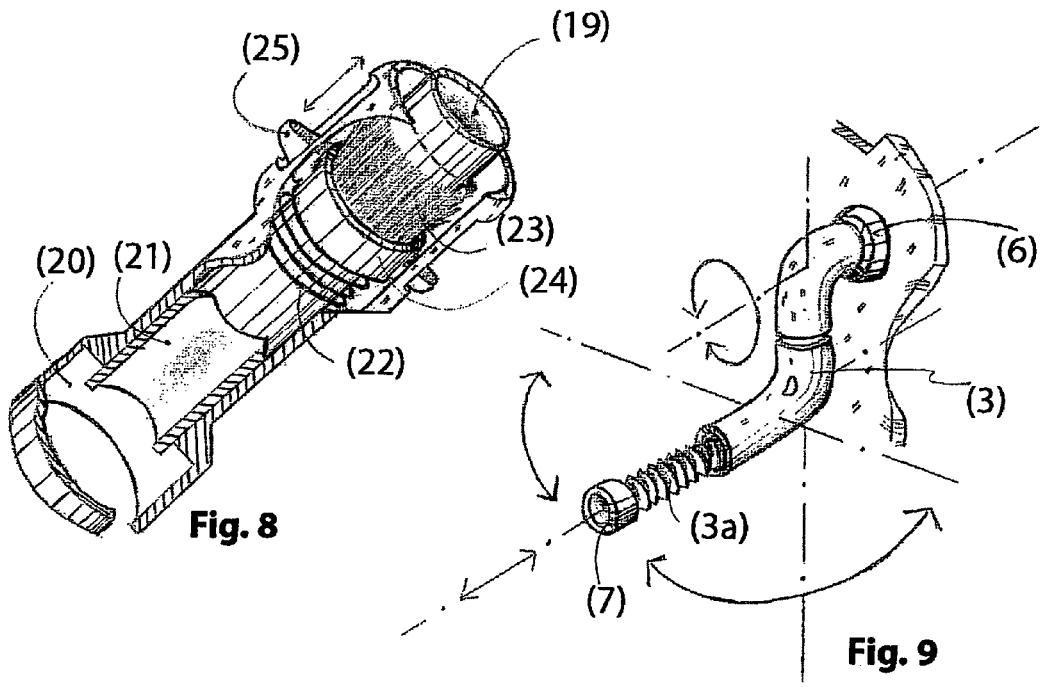
Fig. 8
Fig. 9

APPARATUS FOR VACUUM AND SWEEPING

RELATED APPLICATION/CLAIM OF PRIORITY

This application is related to and claims the priority of provisional application No. 61/455,668, filed Oct. 25, 2010, and entitled Vak pak contour, and which provisional application is incorporated by reference herein.

INTRODUCTION AND SUMMARY OF THE PRESENT INVENTION

The present invention relates to a new and useful apparatus for vacuum, sweeping and cleaning a residential and commercial spaces, in a manner that is easy, efficient and effective, and in a manner that minimizes effort, time of the user, in this case the person who is wearing it.

The apparatus includes a flexible container that encloses some of the vacuum, sweeping and cleaning components that are part of a vacuum system, the flexible container configured to be worn by a person operating the apparatus, and having a flexibility that enables it to conform to the contour of the back of a person wearing the flexible container, and the flexible container is also configured to enable certain components of the vacuum system to be located outside of the container when the container is being worn by a person operating the vacuum system.

The present invention provides a system, system components and a method for Vacuum, sweeping and cleaning a residential and commercial spaces e.g. House or office. The component and system includes a electric motor/turbine assembly connected to a dust collector container/filter assembly via flexible hose.

A swivel arm/extendable hose assembly connected to the bottom/side of the dust Collector container/filter assembly. All this components are housed and arranged into a bag that is designed to be carry on the back of a person or user.

At the end of Swivel arm/extendable hose exists a coupling that can be connecting to a different type of cleaning tools e.g. hose with extension poles, cleaning brushes. The system and components of the vacuum cleaner as its cover or outer skin is made of flexible material e.g. fabric; making lighter and comfortable.

It is a flexible unit, following the contour of user's back, thanks to a flexible unit hose, that separates and at a same time joins the bottom part Motor/turbine assembly with upper part Dust collector/filter assembly, allowing to create a curve shape on users back and making it more comfortable while is in use, thanks to a series of cushion pads located on the rear part that is in contact with user's back. In a preferred arrangement of vacuum system and components described, this System works as follows:

An Electric motor drives a turbine assembly creating a powerful suction force or Vacuum flow; This flow passes through a flexible hose, that connects Motor/turbine Assembly with a Dust filters coupling; Then the flow it is transmitted all over the Dust collector container creating a revolving force, suctioning the air that comes through an intake ring that connects the Dust collector container with a Swivel arm/extendable hose assembly; This vacuum force continues to travel from inside the Swivel arm/extendable hose assembly to the end of tools connecting coupling.

The following aspect it is a novelty component:

Swivel arm/extendable hose assembly; This unit allows the user to have a better Control of the tools in use, permitting free rotary movement as is Up, Down, and to the sides, because it is located to the side and bottom part of vacuum system.

When an extra hose extension is need it, this Swivel arm has an Extendable/Retractable hose inside, it can be use when need it install, without the inconvenience of searching for an additional piece to attach; It is practical and useful.

Another aspect of vacuum system is a new component:

Brush cleaning tool assembly, this gadget is a new improvement to facilitates and makes users job easier and faster in a manner that minimizes effort and time. Brush tool is always ready to use when need it, because, it is always in place as part of Extendable hose attachment tools.

One other aspect of the present invention is a cordless version:

This is a new variant of vacuum system mentioned as present invention. Its main and unique design its that could be used without necessity of being plugged to an electric outlet on the wall, that limits the area of cleaning depending on cord's length.

Other aspect of the present invention will be come apparently from the following detailed description and the accompanying drawing and exhibits.

BRIEF DESCRIPTION OF THE DRAWINGS AND EXHIBIT

FIG. 1 is a schematic illustration of the system, including the system components and the method by which vacuum cleaner is used to fulfill its work, in a manner of minimize effort and time according to the principles of the present invention;

FIG. 2 is a schematic illustration of the vacuum cleaner for a system components and method showing the inside view of the components according to the principles of the present invention;

FIG. 3 is a schematic illustration of the vacuum cleaner for a system component and method showing outside view of the exterior components, according to the principles of the Present invention;

FIG. 4 is a schematic illustration of the vacuum cleaner for a system component and method showing the rear view component, according to the principles of the Present invention;

FIG. 5 is a schematic illustration of the vacuum cleaner for a system component and method showing the side view component, according to the principles of the present invention;

FIG. 6 is a schematic illustration of the vacuum cleaner for a system component and method showing the inside view of the cordless version generator assembly component according to the principles of the present invention;

FIG. 7 is a schematic illustration of the vacuum cleaner for a system component and method of the rechargeable battery pack assembly of the cordless version, According to the principles of the present invention;

FIG. 8 is a schematic illustration of the vacuum cleaner for a system component and method showing the inside view mechanism of the brush cleaning tool assembly component, according to the principles of the present invention; and FIG. 9 is a schematic illustration of the vacuum cleaner for a system component and method of the Swivel arm/Extendable hose assembly, according to the Principles of the present invention.

Exhibit A is a series of photographs showing the manner in which a vacuum cleaner, according to the invention, is used.

DETAILED DESCRIPTION

As described above, the present invention relates to anew and useful system, method And components for vacuum, sweeping and cleaning a residential and commercial spaces, in a manner that is easy, efficient and effective, and in a manner the minimize effort, time of the person that use this new system, in this particular scenario will call it the User. The principles of the invention are described herein in connection with a vacuum cleaner, in this case portable back suitable vacuum cleaner, and from that description the manner in which the principles of the invention can be applied to A new type of attachment and method of cleaning's operation works.

As illustrated in the figures, a system according to the invention includes an electric motor/Turbine assembly (1), connected to the bottom part of a Flexible hose (4), via Coupling ring (10); The top ending of mentioned Flexible hose (4), is connected To a Coupling ring (9), that is located at the bottom part of the Dust collector container (2). The Filter (5), is located inside of the Dust collector container (2), and attached In place to the Coupling ring (9); A Swivel arm (3), is connected to a Coupling ring (6), Located at the bottom and to the side of the Dust collector container (2); inside the Mentioned Swivel arm (2), it is a extendable and retractable hose assembly (3a), at the end exist a Coupling ring tools connecting (7).

As a new variant of the present invention provides a system, component and method for the use of cordless vacuum cleaner version; An Attachment generator assembly (11), is connected to the Exhaust vents (12), of the Electric motor/turbine Assembly (1), in order to recharge the rechargeable batteries pack assembly (13).

Brush cleaning tool assembly (8), is a new improvement of the present invention that Provides a system, system components and method for vacuum and sweeping.

The function and process on the system is as follows:

Once the vacuum system is installed and carried on Users back and the system is plugged into an electric outlet; By turning ON (means by ON is closing the electric circuit of the system), is necessary to push in the power switch ON/OFF (26), in the ON position.

The system works as follows:

Once the Electric motor (1), is running and drives the Turbine (1a), via shaft (25), it creates a powerful suction force, in this particular case mentioned as a vacuum flow; this vacuum flow passes through Coupling ring (10), into a Flexible hose (4). The vacuum flow continues its way through a Coupling ring (9), then trough a Dust Filter (5), and then the vacuum flow it is transmitted all over inside the Dust collector Container (2), creating a revolving and turbulent force inside of mentioned Dust collector container (2), suctioning the air, dust particles and small debris that came from an intake Coupling ring (6), that holds and allows Swivel arm (3), to rotate free, The vacuum flow continues to travel from inside of a Extendable/retractable hose Assembly (3a.) that is located inside of Swivel arm (3), the Tool connecting Coupling (7), is where the vacuum flow iniciates its journey to inside of the vacuum cleaner.

System comprises three main parts:

Electric motor/turbine assembly (1); Dust collector container (2); Swivel arm/extendable and retractable hose assembly (3).

DETAILED FIGURES AND EXHIBITS DESCRIPTION

FIG. 1 is a schematic illustration of the portable back-suitable vacuum cleaner System, including the system components and method in which how is properly wear it and how is properly use it.

FIG. 2 is a schematic illustration of the vacuum cleaner system showing an opening view of the components: Electric motor (1)/Turbine (1a) assembly; Dust collector container (2)/lid container (2a); Swivel arm (3)/Extendable and retractable hose (3a). Flexible hose (4); Dust filter(s); Intake coupling ring; Tools Connecting coupling (7); Coupling ring (9); Coupling ring (10); Shoulder straps (27); Outer Skin (37).

FIG. 3 is a schematic illustration of the vacuum cleaner system describing different components as: Swivel arm (3); Extendable/retractable hose (3a); Power Switch ON/OFF (26); Broad wide shoulder straps (27); latch (29); Waist belt (30); Accordiant fold (31); Electrical cord (32); Cover lid (33); Exhaust vent (33); Exhaust Vents (34); Tools bag compartment (35); Zipper (36).

FIG. 4 is a schematic illustration of the vacuum cleaner system describing differrents components as: Swivel arm (3); tools connecting coupling (7); Power switch ON/OFF (26); Broad wide shoulder straps (27); Cushion pads (28); Latch (29); Waist belt (30).

FIG. 5 is a schematic illustration of the vacuum cleaner system describing differrents components as: Swivel arm (3); Tools connecting coupling (7); Power switch ON/OFF (26); Shoulder straps (27); Latch (29); Waist belt (30); Cover lid (33); Exhaust Vents (34); Tools bag compartment (35); Zipper (36); Bottom body housing ass. (39).

FIG. 6 is a schematic illustration of the vacuum cleaner system of the cordless Version describing different components as: Electric motor (1); Turbine (1a); flexible hose (4); Attachment housing assembly (11); Turbine (12); Gear box (14); Exhaust vents (15); Driven shaft (25); Exhaust vents (34); Bottom body housing Assembly (39).

FIG. 7 is a schematic illustration of the vacuum cleaner system of the cordless Version describing different components as: Electric harness cable (16); Rechargeable battery pack (17); Battery dock assembly (18); Shoulder strap (27).

FIG. 8 is a schematic illustration of the vacuum cleaner system of the Brush cleaning tool assembly describing different components as: Brush cleaning tool Assembly (8); Tool attachment ending inner tube (19); Coupling outer tube (20); Inner tube (21); Coil spring (22); Cleaning brush (23); Brush holder ring (24); Locking tabs (25). Novelties of the present invention system, method and components.

The novelties of the present invention consist of new adaptations: Its cover outer skin (37) is made of flexible materials e.g. fabric, plastic fabric, Making it lighter, comfortable and safe. Contour shape: It is flexible thanks to a flexible unit tube (4), that separates and at a same time joins the bottom body housing assembly (39), with top body housing assembly (38), of the vacuum system. When he/she bends down creates a curve shape following the contour of Users back; Also helps User to feel comfortable while in use thanks to a series of cushion pads located in the rear part that is in contact with user's back.

Swivel arm/Extendable and retractable hose assembly (3) This unit allows the user to have a better control of the tools in use, permitting free Rotary movements like Up, Down and Sides, this is because it is located to the side and bottom part of the Vacuum system. When extra hose-extension is need it, Its Swivel arm (3) has an Extendable/retractable hose (3a) inside; It can be use instantly, without the inconvenience of searching for an additional piece to attach, saving time and effort; making this vacuum cleaner system Efficient and Effective.

Cordless Version: In the present Invention it is a new variant of the mentioned Vacuum cleaner system above. It could be use without the necessity of being Plugged to an electric outlet in the wall, that limit's the area of cleaning depending on cord's length (32). The present invention uses a rechargeable battery Pack (17), located at front of the shoulder straps of the vacuum cleaner to compensate the weight of the vacuum cleaner apparatus on the back of the User.

The next device is a novelty for the vacuum cleaner cordless version; this new gadget works as an Electric generator, that is attached jointly to the Exhaust Vents (34) of the Electric motor (1)/turbine (1a) assembly; In this position the Generator (14) uses the air flow generated by the Turbine (1a) assembly, then This air flow comes out of the exhaust vents (34) and is canalized to rotate the Generators turbine's blades (12); The Turbine's (12) shaft is connected to a Gear box (13) that revolutionized at high speed the shaft of generator (14) producing as much energy as is possible that is been transformed into electric energy That is conducted to the rechargeable batteries pack (17) via cable 16, taking advantage of the wasted energy in the form of air flow to produce an alternative form or electricity to help and keep the rechargeable batteries pack (17) running for a long period of time Compared to the ones the runs only with a simple charge obtained in a regular Charged. This process could be defined as a recycling the wasted energy and Transformed into an electric energy. Also the user will have the sensation of the Movement and feel unleash.

The next piece is a new attachment for the present invention, this gadget is a new improvement, that facilitates and makes Users job easier and faster, these cleaning brush tool (8) is always ready to use when need it, because is located at the end of the extendable hose attachment tool (40), even when is not need it. The retractable brush (23) inside the tool can be use instantly when need it, thanks to a spring loaded mechanism (22) that push the Brush assembly (23/24) outside. The tool (8) when the Locking tabs (25) are released; Avoiding the inconvenience of search and attach a brush cleaning tool.

Exhibits A and B Shows a prototype system and components, according to the Schematic illustration of FIGS. 1-8 and the manner in which a method can be practiced in accordance with the principles of the present Invention. Description of the Exhibits A and B: The picture "Sweeping floor open areas" shows how the vacuum cleaner system is been used in a manner of practice that specific exercise; The picture "vacuuming Top edge corners" shows how the Vacuum cleaner system is been use in a manner of practice different activities; The picture "Sweeping floor small areas" shows how the vacuum cleaner system is been used in a manner of practice these activity; The picture "Dusting ceiling fans and shutters" shows how the Vacuum cleaner system is used in a manner of practice those different activities; The picture "furniture" shows how the vacuum cleaner system is been used in a manner of practice that specific exercise.

The picture "vacuum and dusting under Furniture" shows how the vacuum cleaner system is been used in a manner of practice such a specific activity; The picture—"Sweeping under furniture" shows how the vacuum cleaner system is been used in a manner of practice that activity; The picture "upholstery" shows how the vacuum cleaner system is been used in a manner of practice that specific activity. Exhibits A and B only represent a few examples of which the vacuum cleaner system would practice in a manner of practice many others activities, and which would remain, as will be clear to those in the art.

With the foregoing disclosure in mind, it is believed that various adaptation of a System, component and method for vacuum, sweeping and cleaning in residential and commercial spaces, according of the present Invention, will be apparent to Those in the art.

The invention claimed is:

1. A vacuum, sweeping and cleaning apparatus, comprising:
   a. a flexible container with a single compartment comprising a flexible cover material formed of flexible fabric and encompassing a single volume space that encloses some of the vacuum, sweeping and cleaning components that are part of a vacuum system, the flexible container configured to be worn by a person operating the apparatus, and having a flexibility that enables it to conform to the contour of the back of a person wearing the flexible container, and,
   b. the flexible container also configured to enable certain components of the vacuum system to be located outside of the container when the container is being worn by a person operating the vacuum system;
   wherein an electric motor/turbine assembly, flexible hose, dust collector container and filter are each configured to be connected to each other as a part of the components of the vacuum cleaner system that are enclosed by the single compartment of the flexible container, wherein a swivel arm/extendable and retractable hose assembly forming part of the vacuum system is located outside of the flexible container and the retractable hose assembly is located at least partly inside the swivel arm, and the swivel arm and retractable hose assembly is configured to be oriented to right or left side of the flexible container for right or left hand application, in a manner the make it accessible for a person operating the vacuum system, and wherein the swivel arm can swivel about a pair of axes, each of which is central to a respective portion of the swivel arm/extendable and retractable hose assembly that are oriented transverse to each other.

2. The apparatus of claim 1, wherein the components located outside the flexible container comprise:
   a. shoulder straps that are broad and wide enough to support a series of cushion pads in a manner that make it comfortable and helps to re-distribute the weight of the system to a bigger area, causing less pressure on a user's shoulders,
   b. power switch ON/OFF located on at least one shoulder strap, and remote to the electric motor/turbine assembly, in a manner that make it accessible and controllable to turn ON/OFF the vacuum cleaner,
   c. an adjustable waist belt having one or more latches to facilitate adjustment,
   d. an accordion fold portion that is part of the flexible container that is configured to be connected between an electric motor compartment and an upper part of the flexible container that contains the dust collector that is inside in a manner that make it flexible to follow movement of the shape of a user wearing the apparatus, and
   e. a bag tools compartment that is located on a part of the flexible container that is spaced from a user's back, and is configured to hold at least some extra tools to facilitates the operation of the apparatus.

3. The apparatus of claim 2, wherein the components inside the flexible container comprise
   a. an electric motor/turbine assembly that is configured to produce vacuum force for the apparatus,
   b. a flexible hose assembly that is designed to join the motor/turbine assembly with the vacuum filter inside of the flexible container in a manner in a manner that follows the shape of the user's back's contour as the user is operating the apparatus, c. filter and dust collector components configured to be connected to each other to work in conjunction to retain and store small particles as dust and debris, and d. an intake ring coupling that is configured and designed to hold and permit a swivel arm assembly to rotate freely the apparatus is being operated.

4. The apparatus of claim 3, wherein a cordless version of the apparatus has a rechargeable electric power source located on the shoulder strap, to enable the apparatus to be operated without being plugged to an electric outlet.

5. The apparatus of claim 4, wherein the components on the outside of the flexible container include a device that is been configured to work as a electric generator that is coupled to the vents of the electric motor/turbine assembly in a manner that uses the air flow that comes out of the vents, canalizes the air flow to rotate a generator turbine that is coupled to a gear box that in turn rotates the shaft of a generator producing electricity, enabling electricity from the generator to be conducted to the battery pack, where the electricity can be stored to keep the battery pack charged and running for a long period of time, thereby provide a form of recycling the wasted energy and transforming that wasted energy into a new electric energy.

6. The apparatus of claim 5, wherein the cordless version comprises an attachment to the flexible container that includes a rechargeable battery pack located at the front of the shoulder straps, in a manner designed to compensate the weight of the vacuum cleaner on the back of the user, this rechargeable pack of batteries being charged from the electric generator, via an electrical coupling.

7. The apparatus of claim 6, wherein a brush cleaning tool assembly is located at the end of the extendable hose, and includes a retractable brush inside the tool assembly that can be available for use when the end of the extendable hose is manipulated to enable its use.

\* \* \* \* \*